United States Patent [19]

Stonitsch et al.

[11] 4,084,842
[45] Apr. 18, 1978

[54] CONDUIT SYSTEM WITH EXPANSION COUPLING

[76] Inventors: Lawrence Stonitsch, 2564 Crystal Dr., Joliet, Ill. 40435; Richard W. Stonitsch, Rte. 1, Mound Rd., Joliet, Ill. 60436

[21] Appl. No.: 704,332

[22] Filed: Jul. 12, 1976

[51] Int. Cl.² .................................................. F16L 11/12
[52] U.S. Cl. .................................... 285/47; 285/138; 285/187; 285/287; 285/369; 285/381; 285/423
[58] Field of Search .................. 285/138, 47, 53, 187, 285/133 R, 294, 423, DIG. 5, 287, 369, 302, 381

[56] References Cited

U.S. PATENT DOCUMENTS

| | | | |
|---|---|---|---|
| 3,068,026 | 12/1962 | McKamey | 285/187 X |
| 3,453,716 | 7/1969 | Cook | 285/47 |
| 3,471,177 | 10/1969 | Garrett et al. | 285/133 R |
| 3,492,029 | 1/1970 | French et al. | 285/47 |
| 3,563,572 | 2/1971 | French | 285/47 |
| 3,645,564 | 2/1972 | Corriston | 285/47 |
| 3,854,756 | 12/1974 | Couch | 285/47 |

*Primary Examiner*—Dave W. Arola
*Attorney, Agent, or Firm*—Hill, Gross, Simpson, Van Santen, Steadman, Chiara & Simpson

[57] ABSTRACT

A conduit system composed of insulated jacketed conduit units each having an exposed male conduit end and an opposite integral female conduit end with an internal seal ring carrying groove slidably and sealingly receiving the male end of an adjacent unit thereby forming an expansion coupling between the units. A flexible insulation ring surrounds the coupled ends of the adjacent units and a sleeve surrounds the ring and the adjacent ends of the jackets of the units and is sealed to the jackets. The conduit cores of the units are thus surrounded with insulation and jackets or sleeves and are free to expand and contract withot opening up leakage paths or buckling the installed conduit system regardless of temperature variations normally encountered by the system.

17 Claims, 5 Drawing Figures

U.S. Patent
April 18, 1978
4,084,842
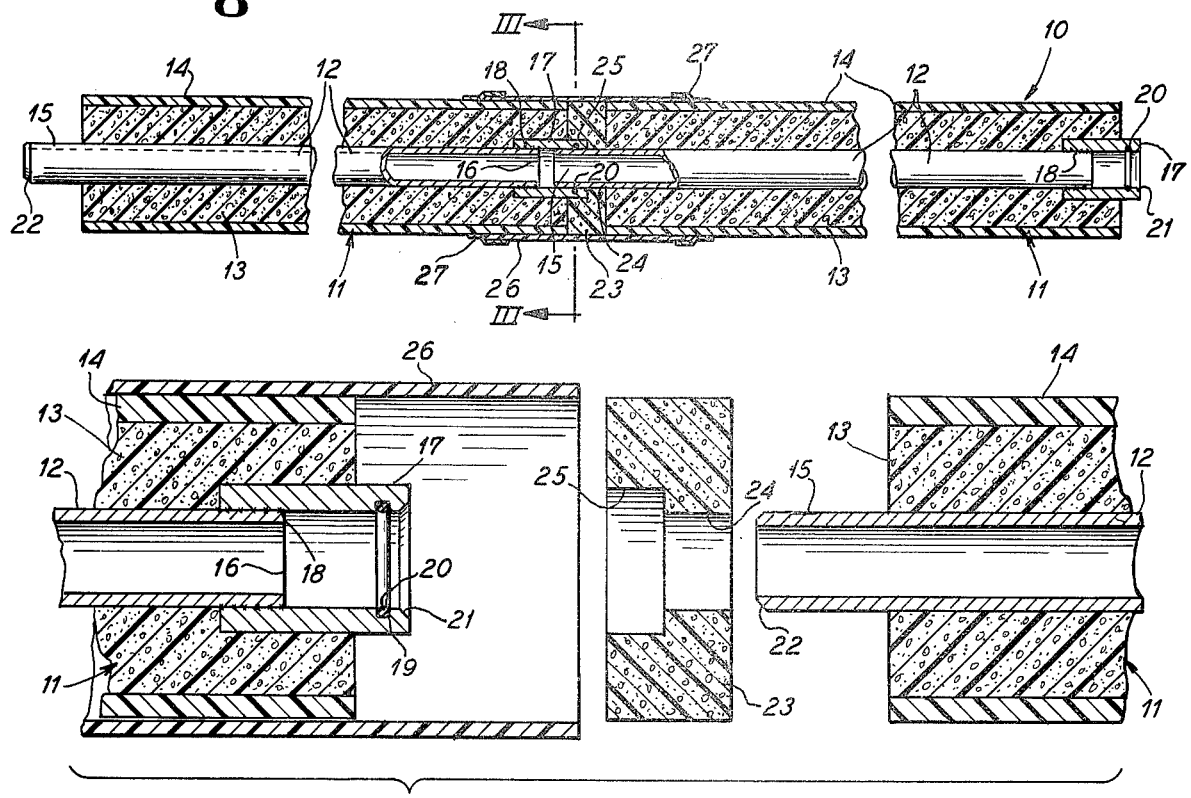
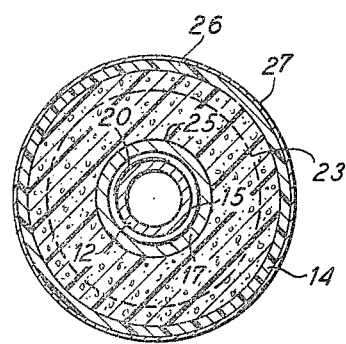
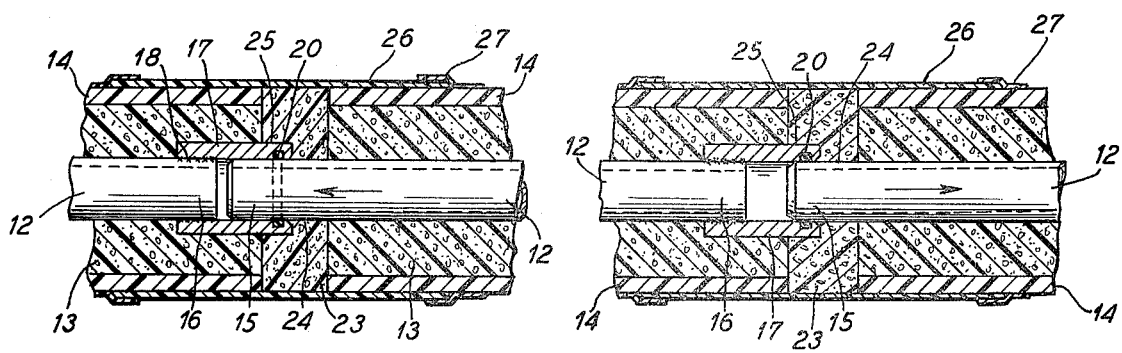

CONDUIT SYSTEM WITH EXPANSION COUPLING

FIELD OF THE INVENTION

This invention relates to the art of insulated conduit systems which can expand and contract without damage or development of leakage paths. The invention specifically deals with insulated pipe or tubing units having integral ends cooperating with adjacent units to form expansion couplings which are easily united and insulated during installation in the field.

PRIOR ART

Heretofore expansion couplings for insulated conduits required separate coupling tubes and a plurality of seals as, for example, in the Couch U.S. Pat. No. 3,854,756, issued Dec. 17, 1974.

SUMMARY OF THIS INVENTION

According to this invention successive lengths of tubing or pipes, surrounded by insulation which in turn is covered by a jacket, are coupled together in the field by providing each tube length with a male end having a deburred smooth rounded edge and a female opposite end carrying a coupling tube slipped over the end of the tube for sufficient distance to provide a good support and bonded to the tube as by means of solder, welding or brazing. The coupling tube projects from the end of the tube and has an internal groove near its free end carrying an O-ring seal. The male end of the tube and the coupling tube on the female end of the tube project beyond the ends of the insulation and the jacket. A flexible insulation washer ring snugly fits over the male end of the tube and is bottomed against the insulation and the jacket of this tube. This ring has a groove in its outboard face snugly receiving the projected end of the coupling tube of an adjacent tube unit. The male end of the washer carrying tube is projected into the coupling tube beyond the O-ring and the flexible washer ring is squeezed between the jackets and insulation of adjacent tube units to prevent the male tube end from bottoming against the female end of the adjacent tube. A sleeve surrounds the washer ring and the end portions of the jackets of the adjacent tubes and is sealed on these jackets, preferably by a heat shrinkable sealant tape.

The invention provides an excellent sealed and insulated coupling between insulated conduit units with only a single working seal. When a string of insulated conduit units of this invention are connected by their integral expansion couplings and buried underground, the resulting pipeline is free to elongate and contract under wide temperature variations without placing any strain on the pipeline. The flexible insulation ring is sealed by the surrounding sleeve against exposure to outside conditions and the male end of the tubing core within the coupling can shift in the ring and the body of insulation while the jacket and sleeve of the unit may be secured underground against slippage.

The telescoped dimensions of the male end of the tube in the coupling tube are such that maximum contraction will not withdraw the male end beyond the O-ring in the coupling tube nor will maximum expansion bottom the male end against any obstruction.

The width of the insulation washer ring is such that when it is squeezed between adjacent conduit units, it will limit penetration of the male end into the coupling tube preventing it from bottoming against the female end of the tube carrying the coupling tube.

The conduit units of this invention preferably have the conduit cores composed of metal or plastics material pipe or tubing with copper, steel or aluminum being preferred metal tubing materials and fiberglass or polyvinyl chloride being preferred plastics tubing materials. The coupling tube is composed of metal or plastics material compatible with the tubing and when copper is the tubing material, the coupling tube is preferably brass. The O-ring in the sleeve is an elastomer, preferably a synthetic oil resistant rubber. The insulation jackets and the coupling jacket or sleeve may be composed of plastics material, steel, aluminum, fiberglass or the like with polyvinyl chloride being preferred. The insulation is preferably a foam expanded plastics material such as urethane foam, foamed glass, polystyrene and the like.

The conduit units are preferably of the order of 20 feet in length and may vary widely in diameter with the carrier pipe or tube core being of the order of ½ to 10 inches in diameter. The outer diameter of the jackets will be of the order of 4 to 14 inches and the plastic insulation body will fill the annular space between the core and the jacket.

It is then an object of this invention to provide a conduit system with expansion couplings that are integrated with the conduit units and require only a single slip seal.

A further object of the invention is to provide insulated conduit units having a male end and an opposite female end with an O-ring seal carrying coupling tube bonded thereon and projecting therefrom to receive the male end of the adjacent unit.

A further object of the invention is to provide a conduit system composed of units having pipe cores surrounded by jacketed insulation and each equipped with an exposed male end and an integral female coupling end carrying a single seal.

A specific object of the invention is to provide an insulated conduit system composed of pipe cores surrounded by plastic insulation foam material and covered with a jacket wherein the pipe cores have an exposed male end and an opposite integral coupling tube end slidably receiving the male end of an adjacent unit with the exposed portions of the coupling tube and the male end covered with an insulation ring squeezed between the insulation and jackets of adjacent units.

A further object of the invention is to eliminate separate coupling tubes in insulated conduit systems while insulating the coupled ends of the conduit units with a surrounding insulation ring and sealing the ring and outer walls of the adjacent units with a jacket sleeve.

Other and further objects of this invention will become apparent to those skilled in this art from the following detailed description of the annexed sheet of drawings which, by way of a preferred example only, illustrates one embodiment of the invention.

ON THE DRAWINGS

FIG. 1 is a longitudinal sectional view of a conduit system according to this invention, with parts broken away.

FIG. 2 is an exploded longitudinal sectional view of the adjoining ends of coupling units in the conduit system of FIG. 1.

FIG. 3 is a transverse cross sectional view along the line III—III of FIG. 1.

FIG. 4 is a fragmentary longitudinal view of the coupled ends of adjacent conduit units of this invention showing the maximum expansion of the units.

FIG. 5 is a view similar to FIG. 4 but showing the maximum contraction of the units.

AS SHOWN ON THE DRAWINGS

The conduit system 10 of FIG. 1 is composed of a plurality of conduit units 11, 11 in end-to-end relation, it being understood that any number of the units 11 may be assembled to provide a pipeline of the desired length. Each unit 11 has a copper pipe or tube core 12 surrounded by a body of polyurethane foam insulation 13 enclosed in a polyvinyl chloride plastics tubular jacket 14. The core 12 has an exposed male end 15 projecting axially beyond the plastic body 13 and jacket 14. The opposite end 16 of the core 12 terminates inside of the plastic body 13 and receives a brass coupling tube 17 therearound. The tube 17 is telescoped over the end 16, a sufficient distance to form a firm support for the tube and a bond 18 composed of solder, or fusion welding or brazing integrates the tube 17 with the core end 16 to provide a female end for the core. The tube 17 projects beyond the end of the insulation body 13 and jacket 14 and has an integral groove 19 near its outboard end receiving an elastomeric O-ring 20. The groove 19 is wider than the O-ring so that the ring can roll in the groove.

The outboard end of the tube 17 is internally beveled at 21 and the end of the exposed male portion 15 of the core 12 is rounded or beveled at 22 so that the male end 15 of one unit 11 is easily inserted in the coupling tube 17 of an adjacent unit 11 to slide therein and be sealed thereto by the O-ring 20.

A polyurethane foam flexible washer ring 23 is interposed between adjacent units 11 and has a central axial aperture or bore 24 snugly receiving the male end 15 of the core 12 with a counterbore 25 snugly receiving the outboard end of the coupling tube 17. The washer ring has an outer diameter substantially the same as the jackets 14.

A polyvinyl chloride plastics jacket sleeve 26 surrounds the washer ring 23 and the adjacent ends of the jackets 14. The ends of this jacket sleeve 26 are sealingly connected to the jackets 14 by heat shrinkable plastics material bands or tape 27.

As shown in FIG. 1, the washer ring 23 is squeezed between the plastic bodies and jackets of the adjacent units 11, snugly embraces the male end 15 of the core 12 and the tube 17 of the adjacent core and in turn is snugly embraced by the jacket sleeve 26 which is sealed to the adjacent jackets. The width of the washer ring 23 is such that it will hold the adjacent units 11, 11 sufficiently apart to prevent bottoming of the male end 15 against the end 16 of the adjacent core. As shown in FIG. 2, adjacent units 11 are easily assembled in end-to-end relation in the field by slipping the washer ring 23 over the male end 15, by projecting the male end 15 into the coupling tube 17 beyond the O-ring 20 and by seating the outboard end of the tube 17 in the counterbore 25 of the washer ring 23. Then the sleeve 26 is slipped over the adjacent ends of the jackets 14 and sealed thereto to complete the assembly of the expansion joint.

As shown in FIG. 3, the single O-ring 20 forms a sliding seal between the male end 15 and the coupling tube 17.

As shown in FIG. 4, the telescoped relationship of the male end 15 and the coupling tube 17 is limited by the washer 23 so that the end 22 of the male portion 15 can never bottom against the end edge 16 of the core in the tube 17.

Conversely, as shown in FIG. 5, the telescoped dimensions of the male end 15 and coupling tube 17 are such that the maximum contraction of the adjacent units 11 will never withdraw the male end 15 beyond the O-ring 20.

From the above description, it should be readily understood that the invention greatly simplifies insulated conduit systems by integrating the parts of expansion couplings joining the units of the system with the cores of the unit and by interposing an insulation washer between adjacent units around the coupling joints formed by the cores of the units. Installation of the units of this invention in the field is thus greatly simplified and rendered foolproof. The invention accomplishes with one seal, functions that heretofore had to be performed by a plurality of seals.

We claim as our invention:

1. A conduit system comprising a plurality of insulated conduit units joined end-to-end in sealed and insulated expansible and contractible relation, each unit having an internal length of pipe, an external tubular jacket, and a mass of insulation between the pipe and jacket, each pipe having a male end projecting beyond the jacket and insulation and a female opposite end, said female end having a coupling tube telescoped thereover and projecting axially therefrom, a bond integrating the telescoped end of the coupling tube with the pipe in fixed sealed relation, said coupling tube projecting beyond the jacket and insulation and having an internal groove adjacent the projected end thereof, an elastometric O-ring in said groove, the male end of one unit snugly slidably fitted in the coupling tube on the female end of an adjacent unit and sealed therewith by said O-ring, a flexible insulation ring squeezed between and in contact with the insulation of adjacent units receiving the male end of one unit therethrough and embracing and contacting the projecting end of the coupling tube, a jacket sleeve embracing the insulation ring and the ends of the jackets of adjacent units, said male end of said internal length of pipe of each unit being shiftable in said insulation ring and mass of insulation to accommodate expansion and contraction without shifting said external jacket and said mass of insulation, said insulation ring positioning the termal end of said male end of the pipe in said coupling tube axially between the O-ring and the terminus of the adjacent pipe in the coupling tube, and means sealingly joining the jacket sleeve with the jackets whereby the male ends of the units are slidably sealed with the female ends of adjacent units to accommodate expansion and contraction of the conduit system and the mated conduit ends are insulated by the insulation ring with the insulation ring being sealed by the jacket sleeve.

2. The system of claim 1 wherein the pipe of each unit is a copper tube, the coupling tube is brass, and the bond integrating the coupling tube with the pipe is solder.

3. The conduit system of claim 1 wherein the means of sealing the jacket sleeve to the jackets are plastic tapes surrounding the ends of the jacket sleeve and embracing the jackets in sealed relation.

4. The conduit system of claim 1 wherein the end edge of the male end of the pipe is externally beveled and the outboard end of the coupling tube is internally beveled.

5. The system of claim 1 wherein the insulation ring has a first bore snugly seated on the male end of the pipe and a counter bore snugly seated on the adjacent coupling tube.

6. The system of claim 1 wherein the insulation ring covers the insulation and jackets of adjacent units.

7. The system of claim 1 wherein the mass of insulation between the pipe and jacket has flat ends and the insulation ring has flat faces bottomed on these flat ends.

8. An insulated conduit system which comprises a series of insulated pipe units to be laid in end-to-end relation and adapted to expand and contract without buckling or leaking, each of said units having a pipe core surrounded by a body of insulation which is covered with a jacket, the pipe core of each unit having an exposed male end and an opposite integral female end of larger internal diameter than the male end and terminating in an internal shoulder with an internal O-ring seal groove axially spaced from said shoulder, an O-ring seal in said groove adapted to slidably and sealingly receive the male end of an adjacent unit, a flexible insulation washer squeezed between and in contact with the insulation of adjacent units and spacing the male end of one pipe core between the O-ring and shoulder of the integral female end of the adjacent pipe core and surrounding the coupled male and female ends of said adjacent units, said male end of the pipe core being shiftable in said insulation washer and said body of insulation to accommodate expansion and contraction without shifting said jacket and said body of insulation, and a sleeve surrounding said washer and sealed to the ends of the jackets of adjacent units.

9. The system of claim 8 wherein the pipe core is a copper tube, the insulation body is plastic foam, and the jacket is a plastics material.

10. The system of claim 8 wherein the female end of the pipe has a coupling tube bonded thereon and projecting therefrom to receive the male end of the adjacent unit.

11. The system of claim 8 wherein the flexible insulation washer is a plastics foam and is squeezed between the adjacent units.

12. The system of claim 8 wherein the insulation washer has a bore snugly surrounding the male end of the pipe core and a counter bore snugly surrounding the female end of the adjacent unit.

13. The system of claim 8 wherein the insulation washer covers the insulation and the jackets of adjacent units.

14. The system of claim 8 wherein the insulation washer is composed of a plastic foam material.

15. The system of claim 8 wherein the jacket is composed of a plastic material and the insulation covered by the jacket is a urethane foam filling the space between the pipe core and the jacket.

16. The system of claim 8 wherein the sleeve is sealed to the ends of the jackets by tapes.

17. The system of claim 16 wherein the tapes are composed of heat shrinkable plastics material.

* * * * *